United States Patent
Di Paolo et al.

(10) Patent No.: US 10,628,632 B2
(45) Date of Patent: Apr. 21, 2020

(54) GENERATING A STRUCTURED DOCUMENT BASED ON A MACHINE READABLE DOCUMENT AND ARTIFICIAL INTELLIGENCE-GENERATED ANNOTATIONS

(71) Applicant: Accenture Global Solutions Limited, Dublin (IE)

(72) Inventors: Gino Andre Di Paolo, Dublin (IE); Bogdan Eugen Sacaleanu, Dublin (IE); Urvesh Bhowan, Dublin (IE); Robert Drysdale, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/950,515

(22) Filed: Apr. 11, 2018

(65) Prior Publication Data
US 2019/0317985 A1 Oct. 17, 2019

(51) Int. Cl.
*G06F 40/169* (2020.01)
*G06F 16/33* (2019.01)
*G06K 9/00* (2006.01)
*G06N 5/02* (2006.01)

(52) U.S. Cl.
CPC .......... *G06F 40/169* (2020.01); *G06F 16/334* (2019.01); *G06K 9/00442* (2013.01); *G06N 5/02* (2013.01); *G06K 2209/01* (2013.01)

(58) Field of Classification Search
CPC .......... G06F 17/241; G06F 17/30675; G06K 9/00442–00483; G06K 2209/01; G06N 5/02
See application file for complete search history.

(56) References Cited

U.S. PATENT DOCUMENTS

| | | | | |
|---|---|---|---|---|
| 2002/0029232 A1* | 3/2002 | Bobrow | ............ | G06F 17/30011 514/534 |
| 2007/0150801 A1* | 6/2007 | Chidlovskii | ........ | G06F 17/2247 715/210 |
| 2009/0067726 A1* | 3/2009 | Erol | ................. | G06F 17/30247 382/197 |
| 2011/0022941 A1* | 1/2011 | Osborne | ........... | G06F 17/30722 715/230 |
| 2014/0223284 A1* | 8/2014 | Rankin, Jr. | ........... | G06F 17/248 715/234 |
| 2014/0245122 A1* | 8/2014 | Oro | ..................... | G06F 17/2785 715/230 |

(Continued)

OTHER PUBLICATIONS

Brat Contributors, "mini-introduction to brat", http://brat.nlplab.org/introduction.html, Feb. 9, 2012, 2 pages.

(Continued)

*Primary Examiner* — Howard Cortes
(74) *Attorney, Agent, or Firm* — Harrity & Harrity, LLP

(57) ABSTRACT

A device obtains a machine readable document, and extracts plain text information from the machine readable document. The device extracts visual structural information from the machine readable document, and processes the plain text information with an artificial intelligence model to generate artificial intelligence-generated annotations. The device aligns the artificial intelligence-generated annotations and the visual structural information to generate a structured document, and provides the structured document for display.

20 Claims, 11 Drawing Sheets

(56) References Cited

U.S. PATENT DOCUMENTS

| | | | |
|---|---|---|---|
| 2015/0074507 A1* | 3/2015 | Riediger | G06F 17/30 |
| | | | 715/230 |
| 2015/0154284 A1* | 6/2015 | Pfeifer | G06F 17/30657 |
| | | | 707/723 |
| 2016/0364608 A1* | 12/2016 | Sengupta | G06K 9/00456 |
| 2017/0109334 A1* | 4/2017 | Anglin | G06F 17/241 |
| 2018/0189604 A1* | 7/2018 | Zhang | G06N 3/0454 |
| 2018/0225259 A1* | 8/2018 | Alba | G10L 15/26 |
| 2019/0012310 A1* | 1/2019 | Cho | G06F 16/36 |

OTHER PUBLICATIONS

Apache UIMA, "Welcome to the Apache UIMA project", https://uima.apache.org/, Jan. 29, 2009, 4 pages.

Constantin A., et al.,"PDFX : fully-automated PDF-to-XML conversion of scientific literature", Proceedings of the 2013 ACM Symposium on Document Engineering, Doceng '13, Dec. 31, 2013, pp. 177, XP055611629.

Extended European Search Report for Application No. EP19159376.3, dated Aug. 19, 2019, 11 pages.

Ping Q., et al., "TYPEFull Paper/Research Progress LitStoryTeller: An Interactive System for Visual Exploration of Scientific Papers Leveraging Named Entities and Comparative Sentences", Sep. 12, 2017, [Retrieved on Aug. 7, 2019] Retrieved from the Internet[URL:https://arxiv.org/ftp/arxiv/papers/1708/1708.02214.pdf], 13 pages, XP055611625.

Steffen K., et al.,"VarifocalReader In-Depth Visual Analysis of Large Text Docum", IEEE Transactions on Visualization and Computer Graphics, US, Dec. 31, 2014, [Retrieved on Oct. 23, 2014], vol. 20 (12), pp. 1723-1732, XP011563282.

\* cited by examiner

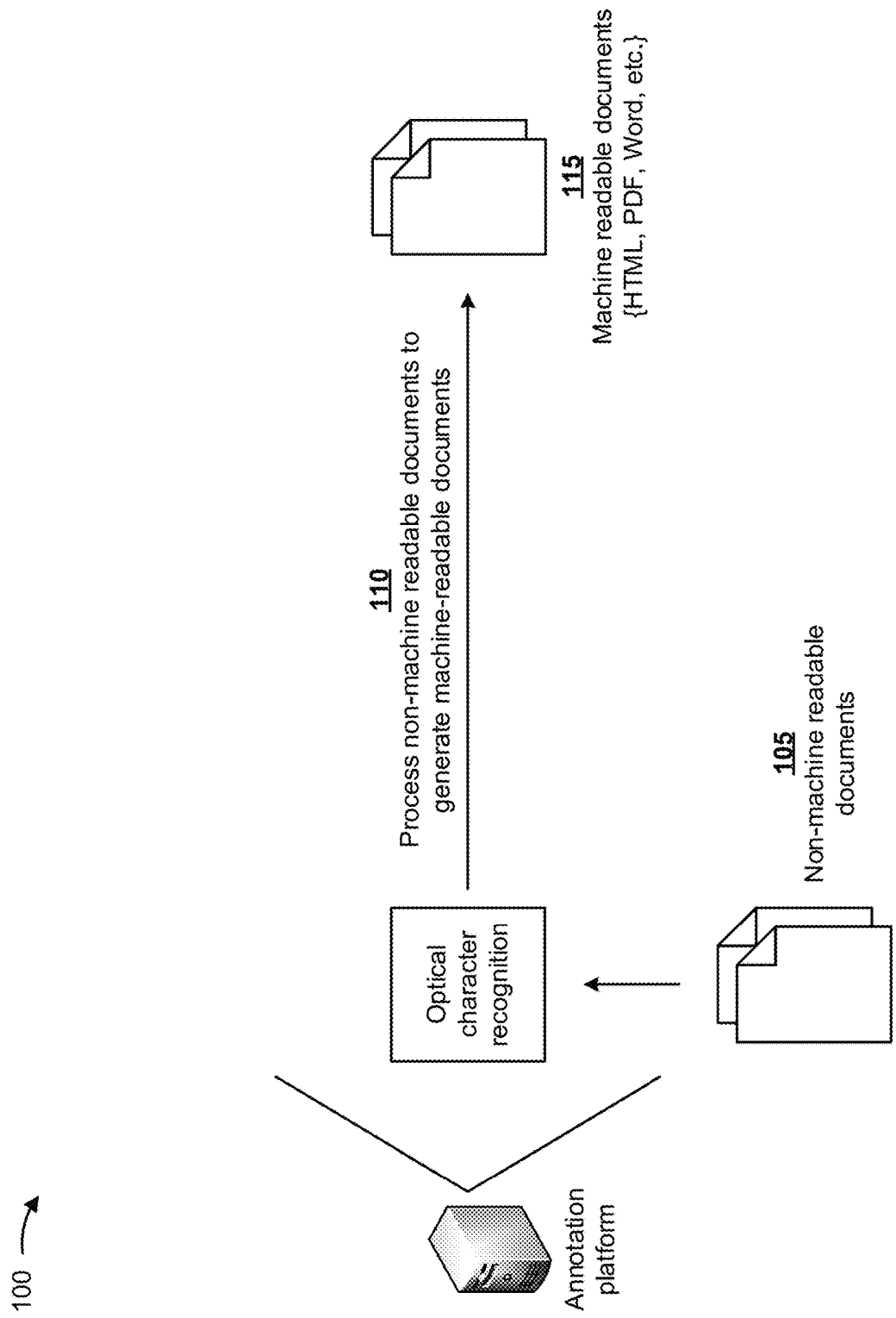

GENERATING A STRUCTURED DOCUMENT BASED ON A MACHINE READABLE DOCUMENT AND ARTIFICIAL INTELLIGENCE-GENERATED ANNOTATIONS

BACKGROUND

Artificial intelligence describes different ways that a machine interacts with a world around it. Through advanced, human-like intelligence (e.g., provided by software and hardware), an artificial intelligence model can mimic human behavior or perform tasks as if the artificial intelligence model were human. Machine learning is an approach, or a subset, of artificial intelligence, with an emphasis on learning rather than just computer programming. In machine learning, a device utilizes complex models to analyze a massive amount of data, recognize patterns among the data, and make a prediction without requiring a person to program specific instructions. Machine learning techniques requires a massive amount of data to compute robust and scalable models (e.g., models used for classification, regression, related prediction tasks, and/or the like).

SUMMARY

According to some implementations, a device may include one or more memories, and one or more processors, communicatively coupled to the one or more memories, to obtain a machine readable document, and extract plain text information from the machine readable document. The one or more processors may extract visual structural information from the machine readable document, and may process the plain text information with an artificial intelligence model to generate artificial intelligence-generated annotations. The one or more processors may align the artificial intelligence-generated annotations and the visual structural information to generate a structured document, and may provide the structured document for display.

According to some implementations, a non-transitory computer-readable medium may store instructions that include one or more instructions that, when executed by one or more processors, cause the one or more processors to receive a non-machine readable document, and process the non-machine readable document to generate a machine readable document. The one or more instructions may cause the one or more processors to extract plain text information from the machine readable document, and create a first document layer. The one or more instructions may cause the one or more processors to extract visual structural information from the machine readable document, and create a second document layer that includes the visual structural information. The one or more instructions may cause the one or more processors to process the plain text information with an artificial intelligence model to identify artificial intelligence-generated annotations for the first document layer, and align and combine the first document layer, with the artificial intelligence-generated annotations, and the second document layer to generate a structured document. The one or more instructions may cause the one or more processors to provide the structured document for display, and receive an additional annotation after providing the structured document for display. The one or more instructions may cause the one or more processors to process the additional annotation with the artificial intelligence model to identify the additional annotation in the first document layer, and align and combine the first document layer, with the artificial intelligence-generated annotations, the second document layer, and the additional annotation to generate a modified structured document.

According to some implementations, a method may include receiving, by a device, a non-machine readable document, and processing, by the device, the non-machine readable document to generate a machine readable document. The method may include extracting, by the device, plain text information from the machine readable document, and extracting, by the device, visual structural information from the machine readable document. The method may include processing, by the device, the plain text information with an artificial intelligence model to identify artificial intelligence-generated annotations in the plain text information, and mapping, by the device, the artificial intelligence-generated annotations with coordinates of the visual structural information. The method may include combining, by the device, the visual structural information and the artificial intelligence-generated annotations, to generate a structured document, based on mapping the artificial intelligence-generated annotations with the coordinates, and providing, by the device, the structured document for display.

BRIEF DESCRIPTION OF THE DRAWINGS

FIGS. 1A-1H are diagrams of an overview of an example implementation described herein;

DETAILED DESCRIPTION

The following detailed description of example implementations refers to the accompanying drawings. The same reference numbers in different drawings may identify the same or similar elements.

An artificial intelligence (AI) model needs plain text in order to process data in documents. For example, an AI model can only perform name recognition, entity recognition, place recognition, disease recognition, and/or the like with documents that are converted into a plain text format. However, when the documents provided to an AI model are converted into the plain text format, the documents lose all formatting (e.g., highlighting, fonts, font sizes, images, tables, graphs, and/or the like). Furthermore, annotations identifying names, entities, places, diseases, and/or the like cannot be mapped to plain text documents by an AI model.

Some implementations described herein provide an annotation platform that generates a structured document based on a machine readable document and artificial intelligence-generated annotations. For example, the annotation platform may receive non-machine readable documents, and may process the non-machine readable documents to generate machine readable documents. The annotation platform may extract plain text information and visual structural information from a machine readable document of the machine readable documents. The annotation platform may create a first document layer, and may create a second document layer with the visual structural information. The annotation platform may process the plain text information with an AI model to generate AI-generated annotations for the first document layer, and may align the first document layer, with the AI-generated annotations, and the second document layer to generate a structured document. The annotation platform may provide the structured document for display, may receive relevant information for the structured document, and may incorporate annotations for the relevant information in the structured document.

Figure 1A:
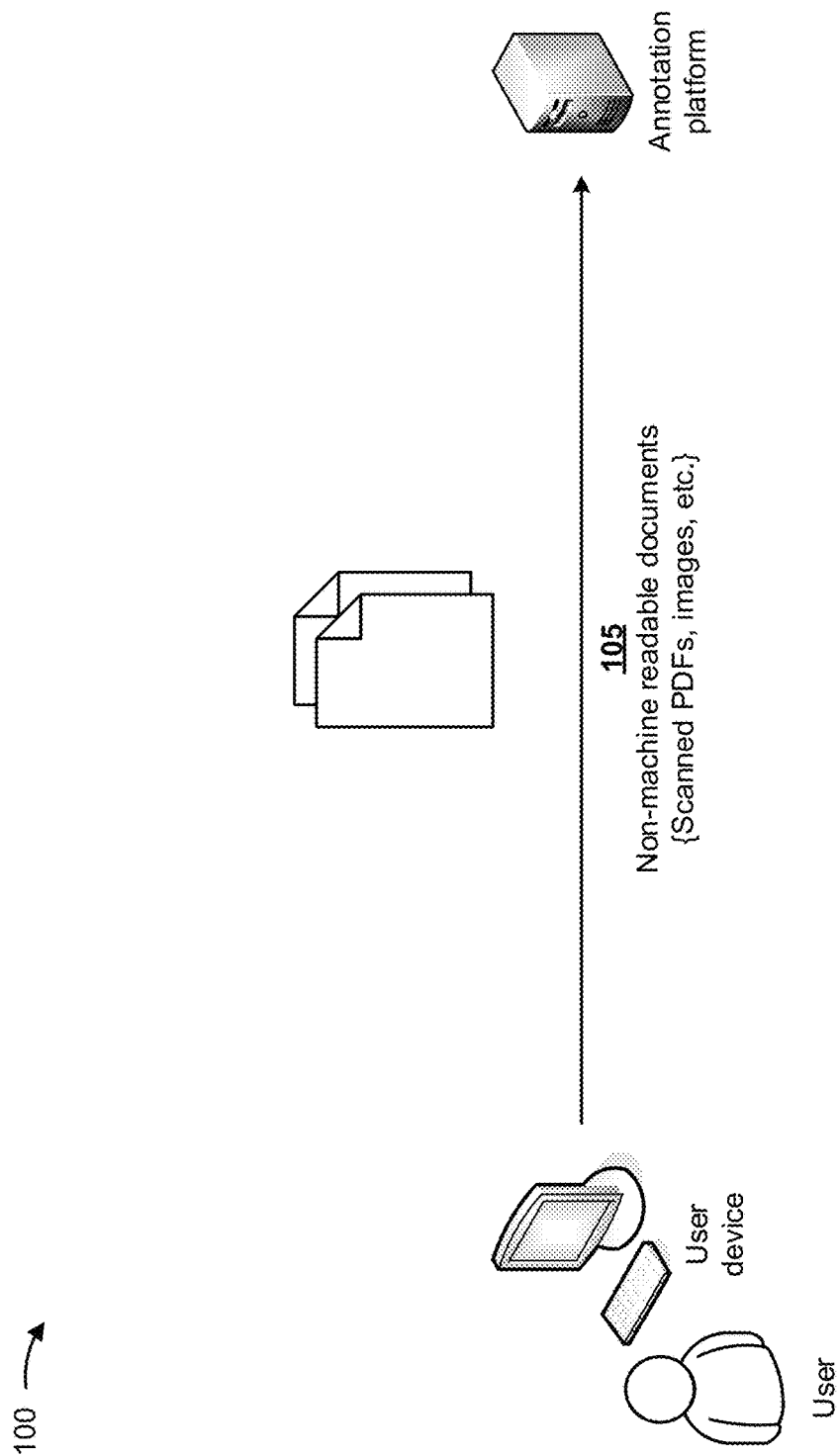

FIGS. 1A-1H are diagrams of an overview of an example implementation 100 described herein. As shown in FIG. 1A, a user device may be associated with an annotation platform. As shown in FIG. 1A, and by reference number 105, a user of the user device (e.g., via a user interface provided to the user) may cause the user device to provide, to the annotation platform, non-machine readable documents (e.g., scanned portable document format (PDF) documents, images, and/or the like) for processing by an AI model. In some implementations, the non-machine readable documents may include audio files, video files, and/or the like. In some implementations, the non-machine readable documents may include information associated with pharmaceuticals, diseases, names of entities, data records (e.g., forms, tables, reports, passports, invoices, bank statements, and/or the like), and/or the like.

In some implementations, the non-machine readable documents may not be stored in the user device, but the user device may cause the non-machine readable documents to be provided from one or more resources, storing the non-machine readable documents, to the annotation platform. In some implementations, the annotation platform may receive the non-machine readable documents, and may store the non-machine readable documents in one or more data structures associated with the annotation platform.

As shown in FIG. 1B, and by reference numbers 105, 110, and 115, the annotation platform may process the non-machine readable documents to generate machine readable documents. In some implementations, the machine readable documents may include documents that may be read and understood by a machine (e.g., a computer), such as hypertext markup language (HTML) documents, readable PDF documents, Word documents, resource description framework (RDF) documents, extensible markup language (XML) documents, JavaScript object notation (JSON) documents, and/or the like.

In some implementations, the annotation platform may perform one or more processing techniques on the non-machine readable documents in order to convert the non-machine readable documents into an electronic, or machine-encoded, data (e.g., the machine readable documents). For example, the annotation platform may utilize optical character recognition, speech recognition, a natural language processing technique, a computational linguistics technique, a text analysis technique, and/or the like in order to convert the non-machine readable documents into the machine readable documents, as described elsewhere herein.

Figure 1C:
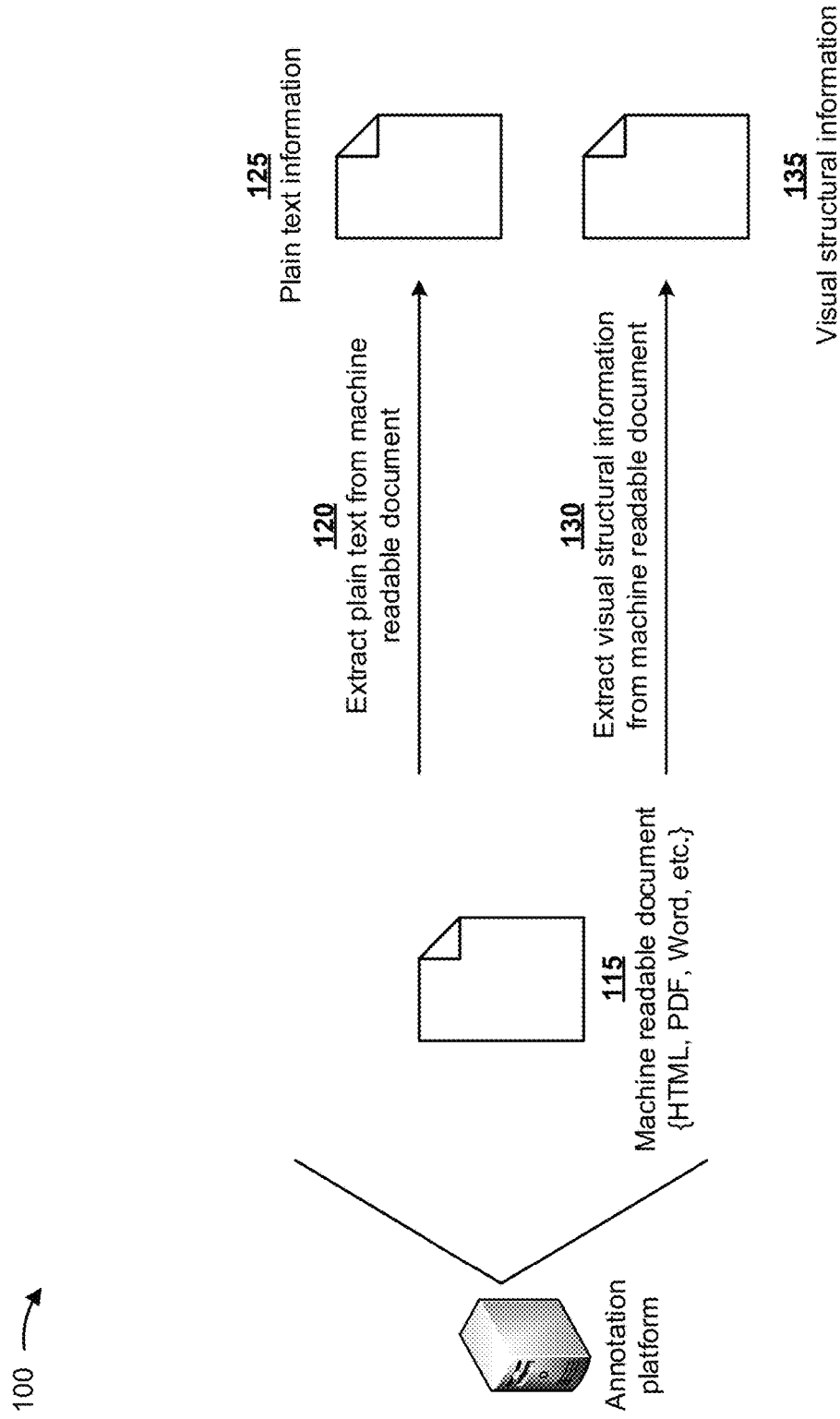

As shown in FIG. 1C, and by reference numbers 115, 120, and 125, the annotation platform may extract plain text information from a machine readable document of the machine readable documents. In some implementations, the plain text information may include textual information (e.g., printed text), provided in the machine readable document, that may be understood and processed by an AI model. In some implementations, the annotation platform may utilize a variety of data extraction methods to extract the plain text information from the machine readable document, such as logical extraction methods (e.g., a full extraction method, an incremental extraction method, and/or the like), as described elsewhere herein.

As further shown in FIG. 1C, and by reference numbers 115, 130, and 135, the annotation platform may extract visual structural information from a machine readable document of the machine readable documents. In some implementations, the visual structural information may include visual information (e.g., tables, graphs, lines, images, highlighting, fonts, font sizes, and/or the like), provided in the machine readable document, that may not be understood and processed by an AI model. In some implementations, the annotation platform may utilize a variety of data extraction methods to extract the visual structural information from the machine readable document, such as logical extraction methods (e.g., a full extraction method, an incremental extraction method, and/or the like), as described elsewhere herein.

Figure 1D:
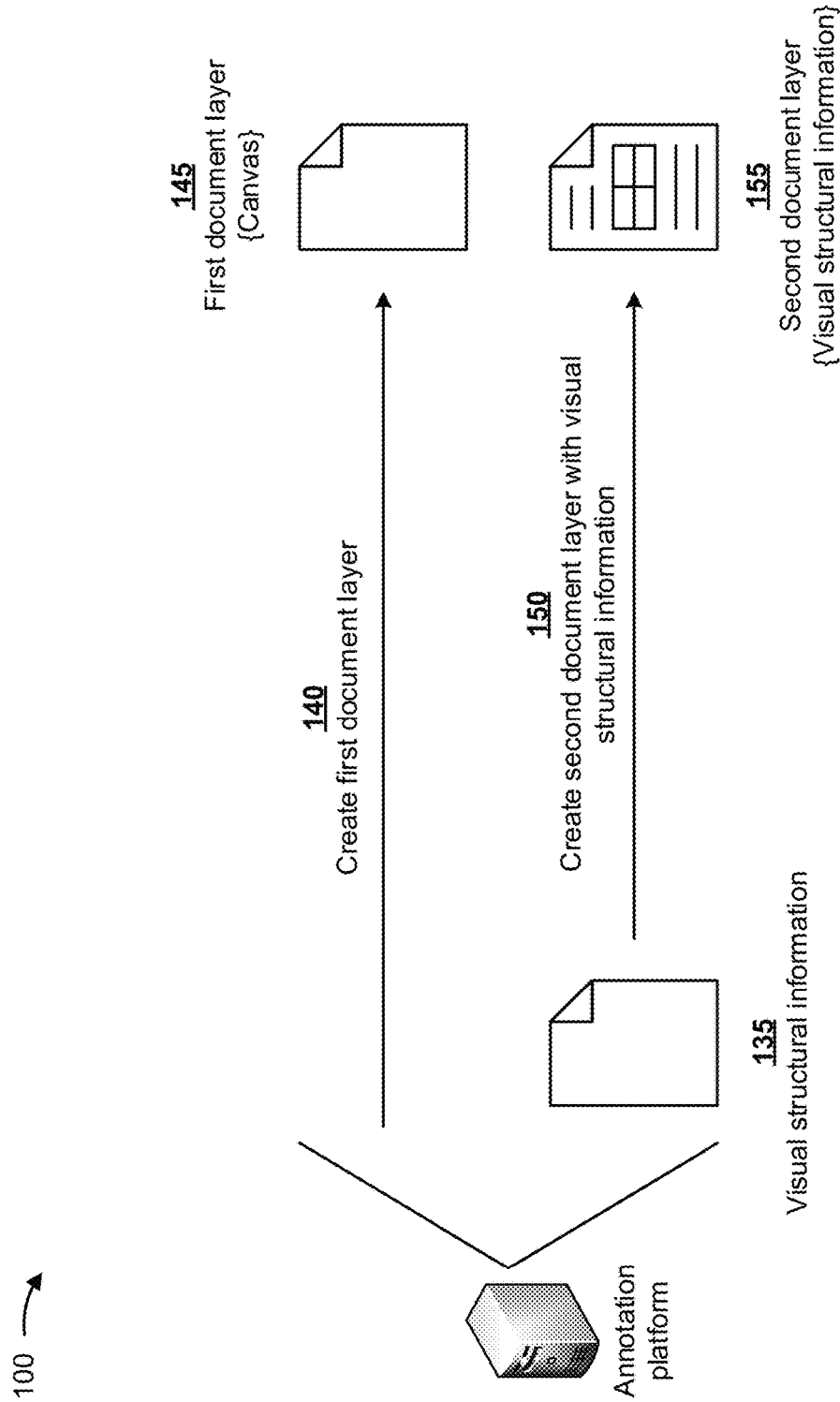

As shown in FIG. 1D, and by reference numbers 125, 140, and 145, the annotation platform may create a first document layer, which may be referred to as an empty canvas or just canvas. In some implementations, the first document layer may include a document layer to which AI-generated annotations are provided, as described elsewhere herein. As further shown in FIG. 1D, and by reference numbers 135, 150, and 155, the annotation platform may create a second document layer with the visual structural information. In some implementations, the second document layer may include a document layer with the visual structural information arranged as set forth in the machine readable document.

Figure 1E:
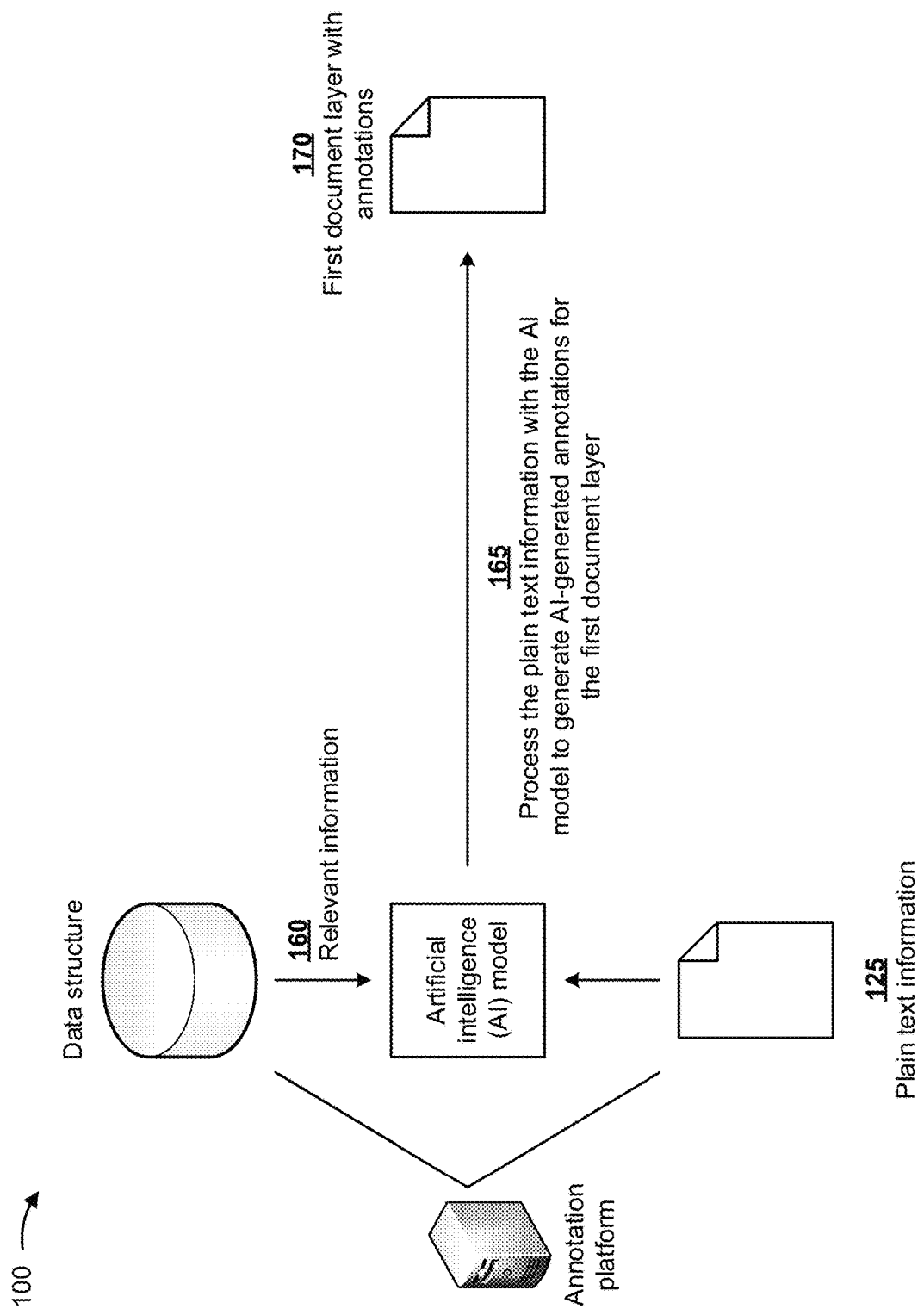

As shown in FIG. 1E, and by reference number 160, an artificial intelligence (AI) model of the annotation platform may be associated with a data structure that provides relevant information based on processing performed by the AI model. In some implementations, the AI model may include any AI model that analyzes text, identifies relevant information in the text based on the analysis, and provides annotations (e.g., different highlighting, different fonts, different text sizes, graphics, and/or the like) to the relevant information in the text. In some implementations, the AI model may include one or more of a named-entity recognition (NER) model, a conditional random field (CRF) model, a naïve string search model, a Rabin-Karp string search model, a Knuth-Morris-Pratt model, a Boyer-Moore string search model, a two-way string-matching model, and/or the like, as described elsewhere herein.

As further shown in FIG. 1E, and by reference numbers 145, 160, and 165, the annotation platform may process the plain text information with the AI model and the relevant information to generate AI-generated annotations for the first document layer. In some implementations, the annotation platform may utilize the AI model to compare the plain text information and the relevant information, and to identify matching relevant information in the plain text information based on the comparison. In such implementations, and as shown by reference number 170 in FIG. 1E, the annotation platform may generate annotations (e.g., different highlighting, different fonts, different text sizes, graphics, and/or the like) for the matching relevant information, in the first document layer.

Figure 1F:
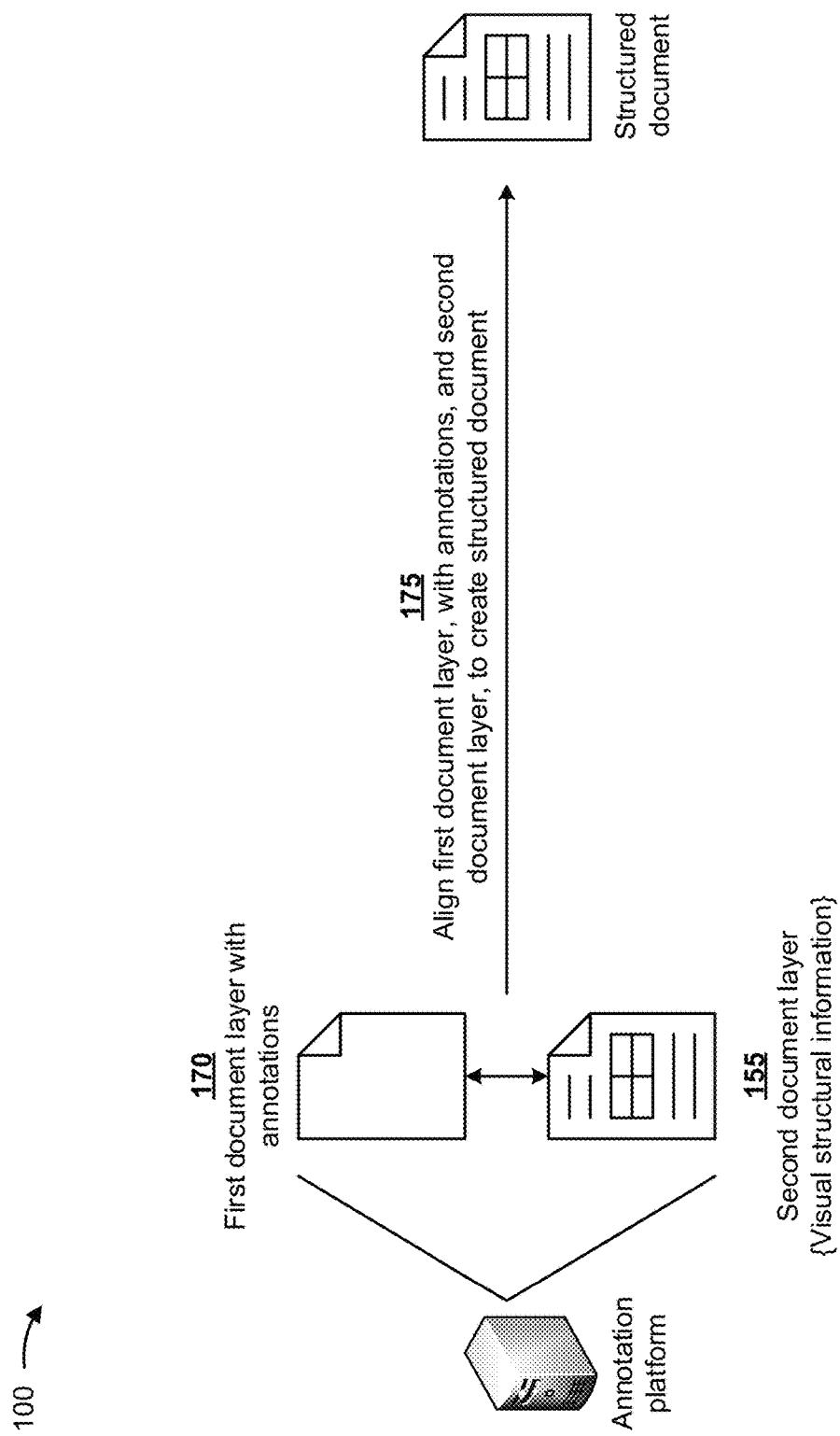

As shown in FIG. 1F, and by reference numbers 155, 170, and 175, the annotation platform may align the first document layer (e.g., with the annotations) and the second document layer to create a structured document. In some implementations, the annotation platform may align and combine the first document layer, with the annotations, and the second document layer to create the structured document. In some implementations, the structured document may include a document that combines the visual structural information and the annotations into a single document.

Figure 1G:
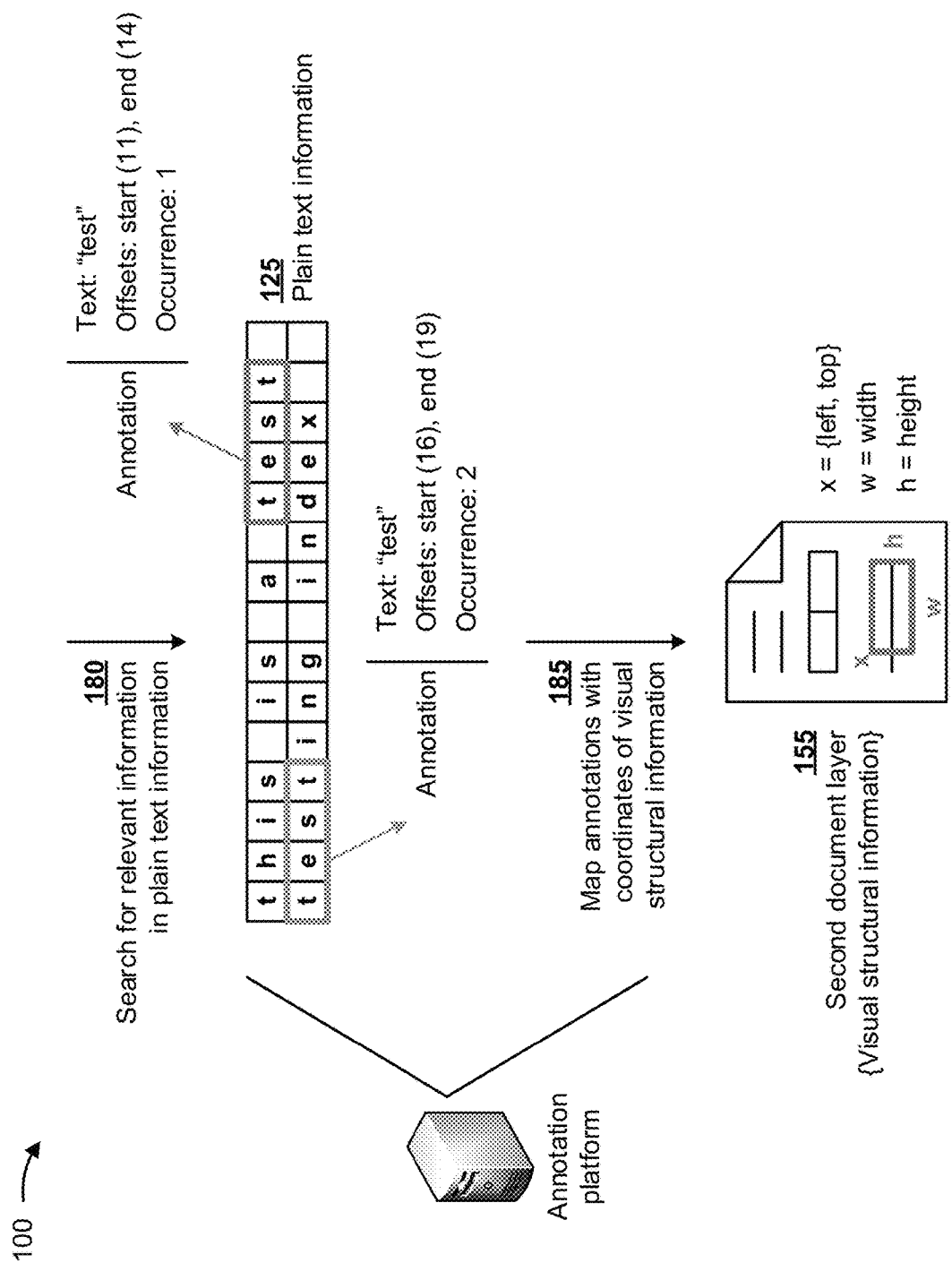

FIG. 1G provides an example of how the annotation platform may match the relevant information with the plain text information, generate the annotations for the matched relevant information, and align the annotations with the visual structural information (e.g., the second document layer). As shown in FIG. 1G, and by reference numbers 125 and 180, the annotation platform may search for the relevant information in the plain text information, may match the relevant information with the plain text information, and may generate the annotations for the matched relevant information. For example, if the relevant information includes the text "test," the annotation platform may search for and locate the text "test" at a first location of the plain text information (e.g., at a start offset of "11" and at an end offset of "14"). The annotation platform may indicate that the first location of the text "test" is a first occurrence of the text "test" in the plain text information. The annotation platform may continue to search for and locate the text "test" at a second location of the plain text information (e.g., at a start offset of "16" and at an end offset of "19"). The annotation platform may indicate that the second location of the text "test" is a second occurrence of the text "test" in the plain text information. In some implementations, the annotation platform may continue this process until all occurrences of the text "test" are located and annotated in the plain text information.

As further shown in FIG. 1G, and by reference numbers 155 and 185, the annotation platform may map the determined annotations with coordinates in the visual structural information (e.g., the second document layer). In some implementations, the annotation platform may search for the relevant information associated with the annotations, may match the relevant information with the visual structural information, and may map the matched annotations with coordinates in the visual structural information. For example, if the relevant information includes the text "test," the annotation platform may search for and locate the first occurrence of the text "test" at a coordinate (e.g., x, which indicates a left, top corner of the text "test") of the visual structural information. The annotation platform may also determine a width (w) and a height (h) of the first occurrence of the text "test" in the visual structural information. In some implementations, the annotation platform may continue this process until all annotations of the text "test" are mapped with coordinates, widths, and heights of the visual structural information.

In some implementations, the annotation platform may determine whether an occurrence of text is available in the annotations. If the occurrence of the text is not available, the annotation platform may perform the functions described above in connection with FIG. 1G to identify an annotation, and may associate the occurrence with the identified annotation. If the occurrence of the text is available, the annotation platform may identify an annotation within the visual structural information (e.g., based on the text and the occurrence of the text). The annotation platform may also receive annotations based on manual selection of text to annotate, and may mark the selection as a unique instance. The annotation platform may determine offsets from the selected text based on the selected text and occurrence of the selected text with an identifier. The annotation platform may determine annotation coordinates for all annotations from the visual structure information, and may provide highlighting to the first document layer (e.g., the canvas) for the annotations (e.g., based on coordinates, as described in FIG. 1G).

Figure 1H:
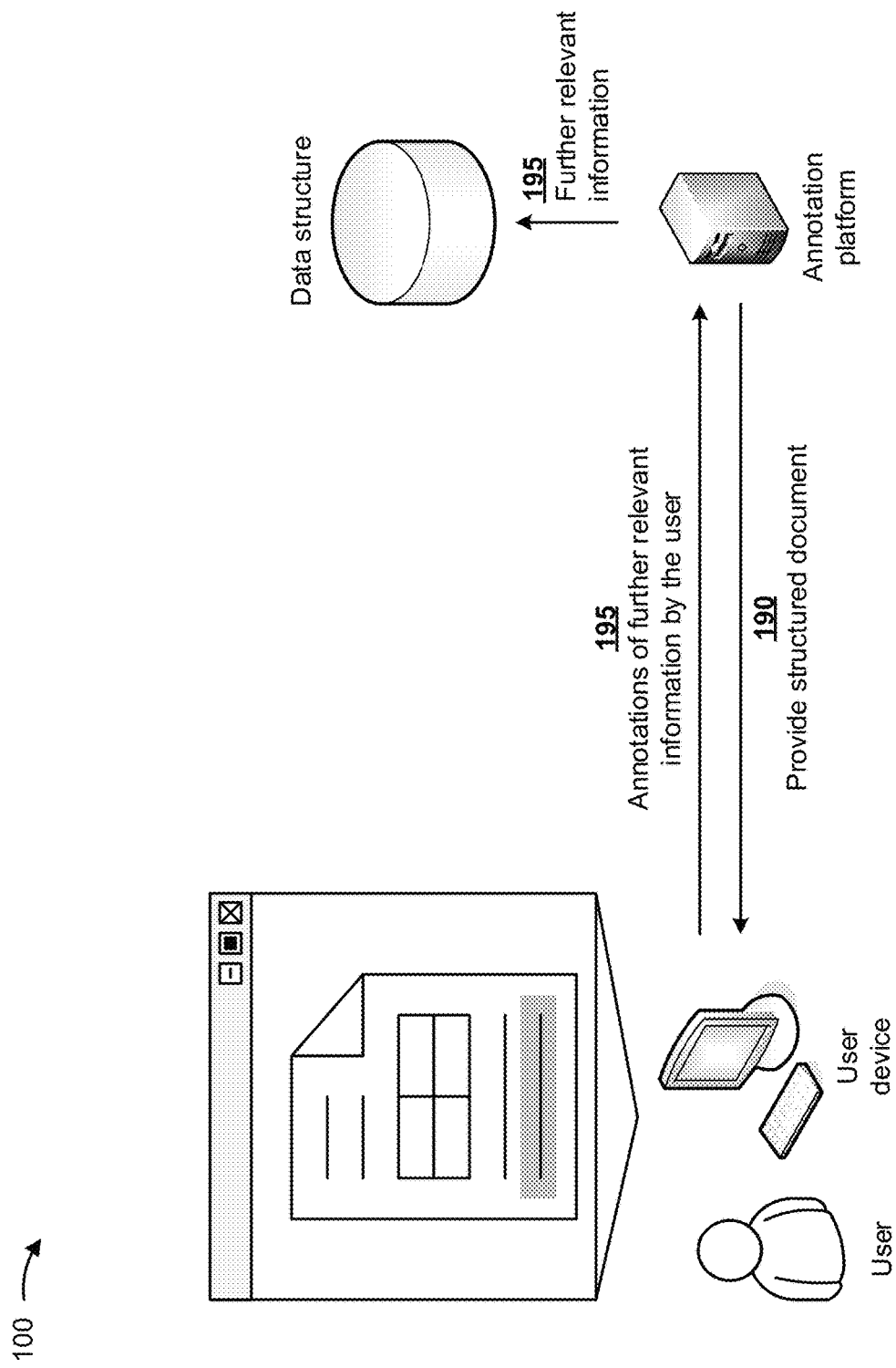

As shown in FIG. 1H, and by reference number 190, the annotation platform may provide the structured document for display to the user device, and the user device may display the structured document to the user (e.g., via a user interface). For example, the user device may display the structured document with a first annotation (e.g., a top highlighted area). In some implementations, the user may utilize the user device to provide annotations of further relevant information. For example, the user may provide a second annotation (e.g., a bottom highlighted area) of the further relevant information.

As further shown in FIG. 1H, and by reference number 195, the user device may provide information, indicating the annotations of the further relevant information, to the annotation platform, and the annotation platform may provide the information, indicating the annotations of the further relevant information, to one or more data structures associated with the annotation platform. In some implementations, the annotation platform may incorporate the annotations of the further relevant information into the structured document.

In some implementations, the annotation platform may enable the user (e.g., via the user device) to interact with the structured document (e.g., to add, update, delete, and/or the like, annotations associated with the structured document). In some implementations, the AI models described herein may be updated based on input from the user.

In this way, several different stages of the process for generating a structured document based on a machine readable document and AI-generated annotations are automated, which may remove human subjectivity and waste from the process, and which may improve speed and efficiency of the process and conserve computing resources (e.g., processors, memory, and/or the like). Furthermore, implementations described herein use a rigorous, computerized process to perform tasks or roles that were not previously performed or were previously performed using subjective human intuition or input. These tasks may include utilizing an AI model with all types of documents, without losing formatting of the documents, and mapping AI-generated annotations to the documents. Automating the process for generating a structured document based on a machine readable document and AI-generated annotations conserves computing resources (e.g., processors, memory, and/or the like) that would otherwise be wasted in attempting to generate the structured document. Finally, generating a structured document based on a machine readable document and AI-generated annotations improves usability, time consumption, and efficiency for people reviewing and/or manipulating structured documents.

As indicated above, FIGS. 1A-1H are provided merely as examples. Other examples are possible and may differ from what was described with regard to FIGS. 1A-1H.

Figure 2:
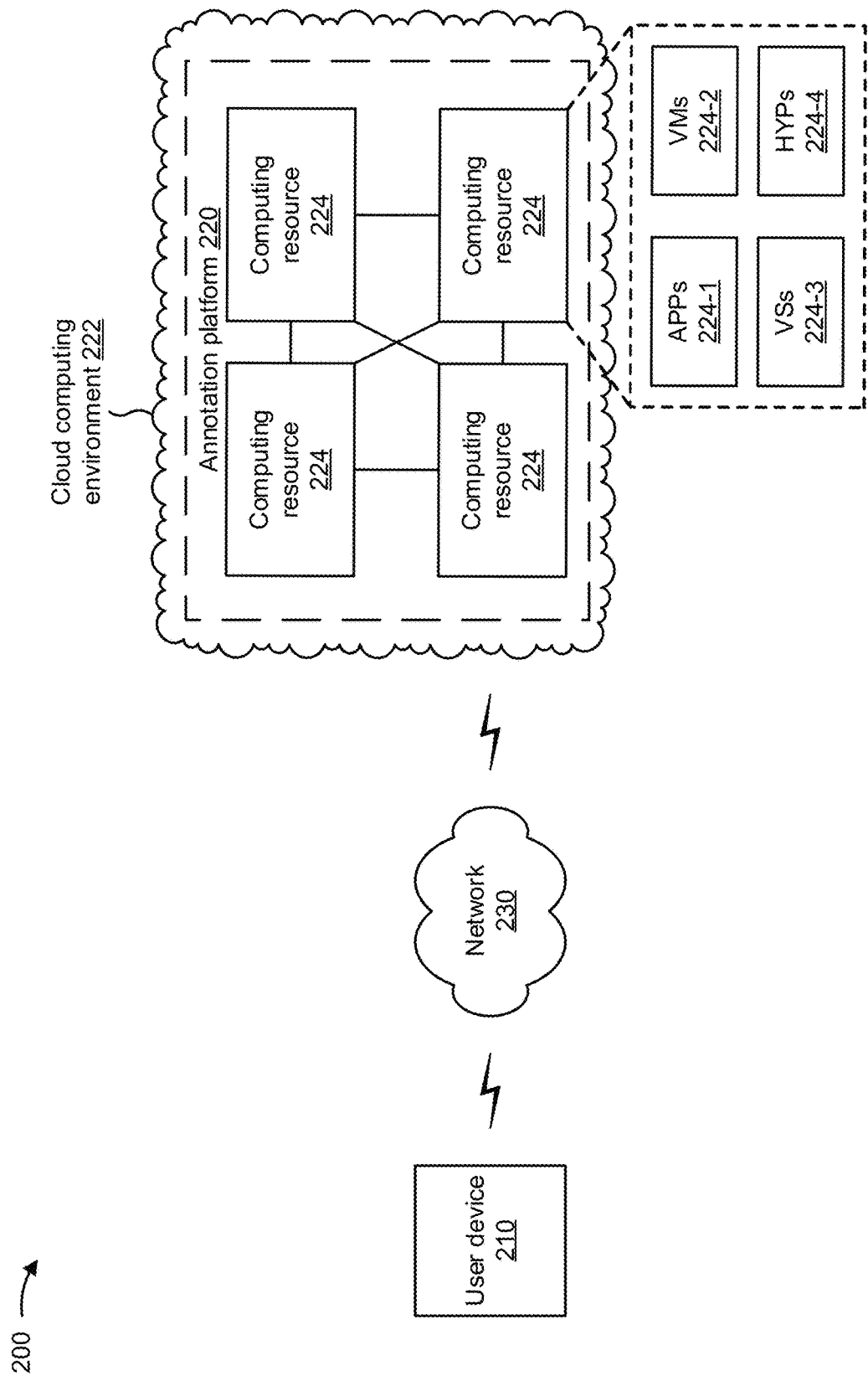
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an annotation platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to annotation platform 220.

Annotation platform 220 includes one or more devices that generate a structured document based on a machine readable document and artificial intelligence-generated annotations. In some implementations, annotation platform 220 may be designed to be modular such that certain software components may be swapped in or out depending on a particular need. As such, annotation platform 220 may be easily and/or quickly reconfigured for different uses. In some implementations, annotation platform 220 may receive information from and/or transmit information to one or more user devices 210.

In some implementations, as shown, annotation platform 220 may be hosted in a cloud computing environment 222. Notably, while implementations described herein describe annotation platform 220 as being hosted in cloud computing environment 222, in some implementations, annotation platform 220 may not be cloud-based (i.e., may be implemented outside of a cloud computing environment) or may be partially cloud-based.

Cloud computing environment 222 includes an environment that hosts annotation platform 220. Cloud computing environment 222 may provide computation, software, data access, storage, etc. services that do not require end-user knowledge of a physical location and configuration of system(s) and/or device(s) that hosts annotation platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host annotation platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with annotation platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of annotation platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
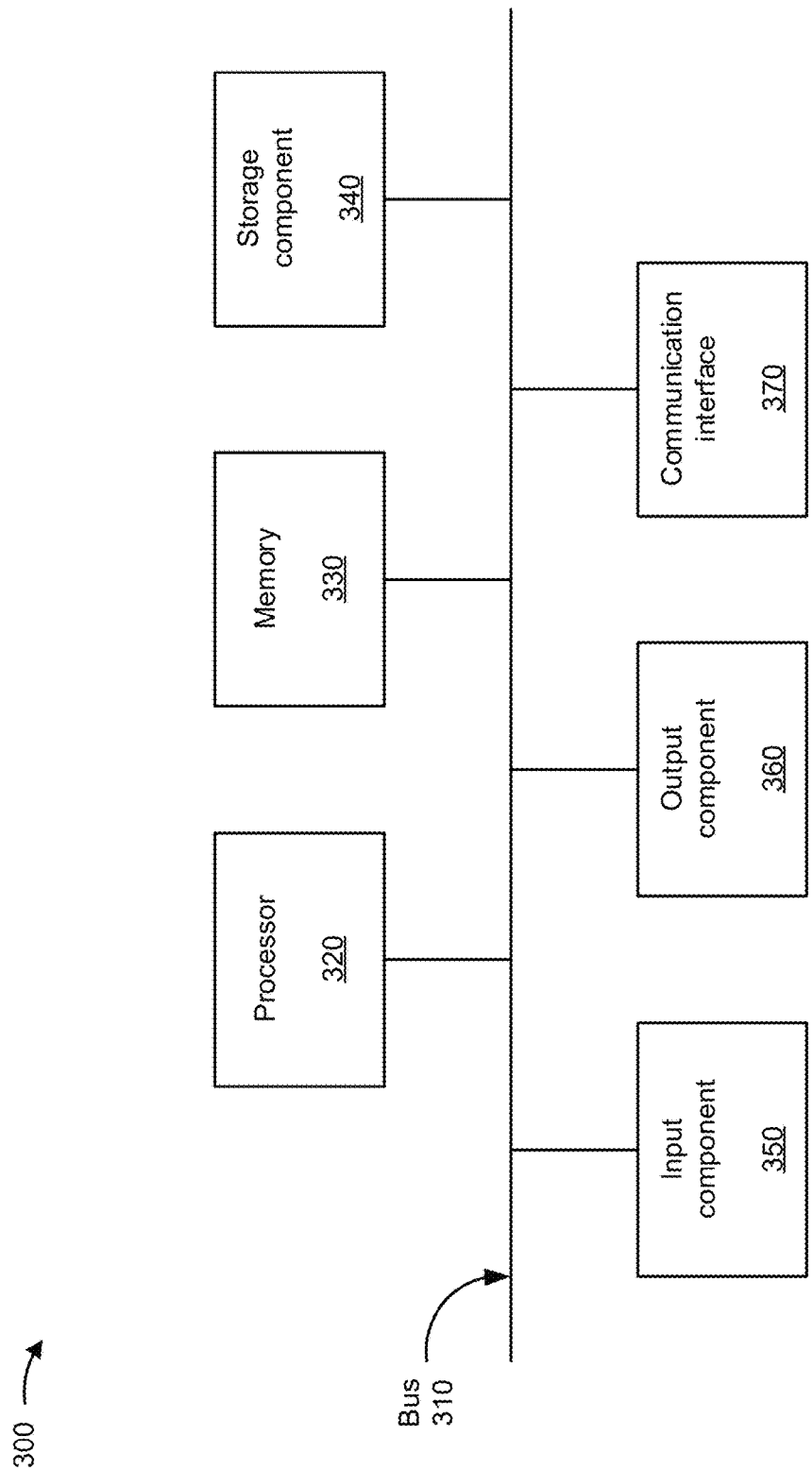
FIG. 3 is a diagram of example components of one or more devices of FIG. 2.

FIG. 3 is a diagram of example components of a device 300. Device 300 may correspond to user device 210, annotation platform 220, and/or computing resource 224. In some implementations, user device 210, annotation platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
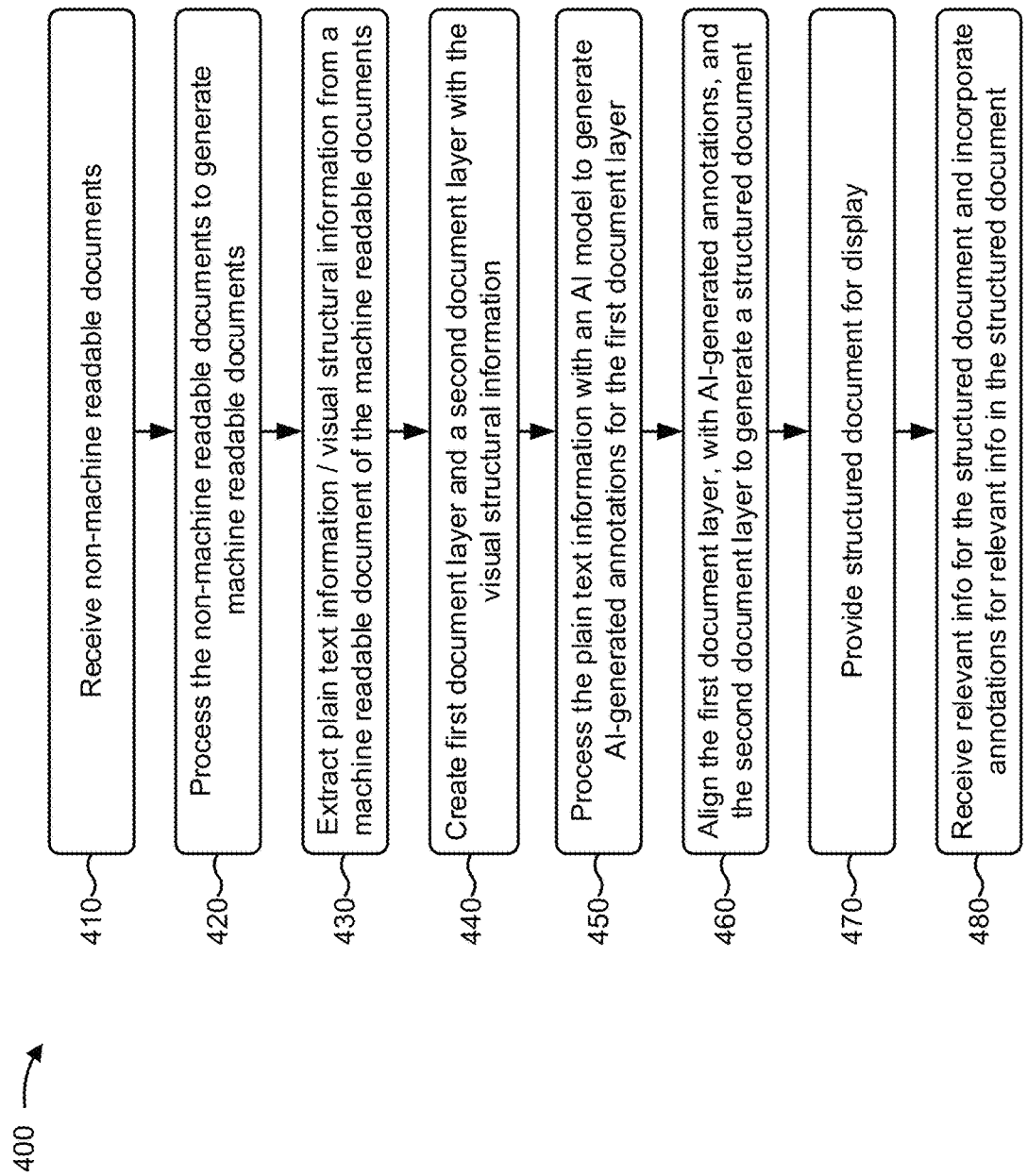
FIG. 4 is a flow chart of an example process for generating a structured document based on a machine readable document and artificial intelligence-generated annotations.

FIG. 4 is a flow chart of an example process 400 for generating a structured document based on a machine readable document and artificial intelligence-generated annotations. In some implementations, one or more process blocks of FIG. 4 may be performed by annotation platform 220. In some implementations, one or more process blocks of FIG. 4 may be performed by another device or a group of devices separate from or including annotation platform 220, such as user device 210.

As shown in FIG. 4, process 400 may include receiving non-machine readable documents (block 410). For example, annotation platform 220 (e.g., using computing resource 224, processor 320, communication interface 370, and/or the like) may receive non-machine readable documents. In some implementations, a user of user device 210 (e.g., via a user interface provided to the user) may cause user device 210 to provide, to annotation platform 220, non-machine readable documents (e.g., scanned PDF documents, images, and/or the like) for processing by an AI model.

In some implementations, the non-machine readable documents may include PDF documents containing tables of data. In such implementations, the PDF documents may be digital, but are not machine-readable because a computer may not access the tables of data. In some implementations, the non-machine readable documents may include scans (e.g., images in any image format, such as joint photographic experts group (JPEG) format, tagged image file format (TIFF), bitmap file format, and/or the like) of text that are not machine-readable.

In some implementations, the non-machine readable documents may include information to be processed by an AI model, but that cannot be processed by the AI model since the information is not machine readable. For example, the non-machine readable documents may include information associated with pharmaceuticals, diseases, medical fields, names of entities, data records (e.g., forms, tables, reports, passports, invoices, bank statements, and/or the like), intellectual property, text transcripts, company records, customers, and/or the like. In some implementations, the non-machine readable documents may include audio files, video files, and/or the like.

In some implementations, the non-machine readable documents may not be stored in user device 210, but user device 210 may cause the non-machine readable documents to be provided from one or more resources, storing the non-machine readable documents, to annotation platform 220. In some implementations, annotation platform 220 may receive the non-machine readable documents, and may store the non-machine readable documents in one or more data structures associated with annotation platform 220.

In this way, annotation platform 220 may receive the non-machine readable documents.

As further shown in FIG. 4, process 400 may include processing the non-machine readable documents to generate machine readable documents (block 420). For example, annotation platform 220 (e.g., using computing resource

224, processor 320, and/or the like) may process the non-machine readable documents to generate machine readable documents. In some implementations, the machine readable documents may include documents that may be read and understood by a machine (e.g., a computer), such as HTML documents, readable PDF documents, Word documents, RDF documents, XML documents, JSON documents, and/or the like.

In some implementations, annotation platform 220 may perform one or more processing techniques on the non-machine readable documents in order to convert the non-machine readable documents into an electronic, or machine-encoded, data (e.g., the machine readable documents). For example, annotation platform 220 may utilize optical character recognition, speech recognition, a natural language processing technique, a computational linguistics technique, a text analysis technique, and/or the like in order to convert the non-machine readable documents into the machine readable documents.

In some implementations, annotation platform 220 may utilize optical character recognition (OCR) with the non-machine readable documents in order to convert the non-machine readable documents into electronic data files (e.g., the machine readable documents). OCR involves a conversion of images of typed, handwritten, or printed text into machine-encoded text. For example, OCR may be applied to a scanned document, a photo of a document, a photo of a scene that includes text, and/or the like, to produce electronic data (e.g., plain text data). OCR can be used as a form of information entry from printed paper data records (e.g., printed forms, printed tables, printed reports, passport documents, invoices, bank statements, and/or the like). Converting printed text to electronic data allows the information represented by the printed text to be electronically edited, searched, stored more compactly, displayed online, and/or used in machine processes such as cognitive computing, machine translation, (extracted) text-to-speech, key data and text mining, and/or the like. Implementations of OCR may employ pattern recognition, artificial intelligence, computer vision, and/or the like.

In some implementations, annotation platform 220 may utilize speech recognition with the non-machine readable documents (e.g., when the non-machine readable documents are audio files, video files, and/or the like) to convert the non-machine readable documents into text-based data files (e.g., the machine readable documents). Speech recognition, which may also be known as automatic speech recognition (ASR), computer speech recognition, or speech to text (STT), involves recognizing (e.g., by a computer system) spoken language and translating the spoken language into text. For example, speech recognition may include converting audio data representing recorded language, words, or sentences, to text data representing the recorded language, words, or sentences. Speech recognition technology generally incorporates knowledge and research in the linguistics, computer science, and electrical engineering fields. Applications of speech recognition include data entry (e.g., entering a credit card number), preparation of structured documents (e.g. a radiology report), speech-to-text processing (e.g., word processors or emails), and/or the like.

In some implementations, annotation platform 220 may utilize a natural language processing technique, a computational linguistics technique, a text analysis technique, and/or the like, with the machine readable documents in order to make the machine readable documents analyzable. For example, annotation platform 220 may apply natural language processing (NLP) to interpret the machine readable documents and generate additional information associated with the potential meaning of information within the machine readable documents. Natural language processing involves techniques performed (e.g., by a computer system) to analyze, understand, and derive meaning from human language in a useful way. Rather than treating text like a mere sequence of symbols, natural language processing considers a hierarchical structure of language (e.g., several words can be treated as a phrase, several phrases can be treated as a sentence, and the words, phrases, and/or sentences convey ideas that can be interpreted). Natural language processing can be applied to analyze text, allowing machines to understand how humans speak, enabling real world applications such as automatic text summarization, sentiment analysis, topic extraction, named entity recognition, parts-of-speech tagging, relationship extraction, stemming, and/or the like.

In some implementations, annotation platform 220 may utilize a computational linguistics technique with the machine readable documents in order to make the machine readable documents analyzable. The computational linguistics technique may include a technique that applies computational linguistics to interpret the machine readable documents and generate additional information associated with the potential meaning of information within the machine readable documents. Computational linguistics includes techniques for understanding written and spoken language from a computational perspective, and building artifacts that usefully process and produce language. For example, computational linguistics may employ computational models of various kinds of linguistic phenomena.

In some implementations, annotation platform 220 may utilize a text analysis technique with the machine readable documents in order to make the machine readable documents analyzable. The text analysis technique may include a technique that applies text analysis to interpret the machine readable documents and generate additional information associated with the potential meaning of information within the machine readable documents. Text analysis may include parsing text in order to extract machine-readable facts from the text, and creating sets of structured data (e.g., out of heaps of unstructured, heterogeneous documents). Text analysis (e.g., content analysis) may include systematic reading or observation of text or artifacts which are assigned labels to indicate a presence of interesting, meaningful patterns, allowing for statistical estimation of proportions of patterns in the text, as well as correlations between patterns.

In this way, annotation platform 220 may process the non-machine readable documents to generate the machine readable documents.

As further shown in FIG. 4, process 400 may include extracting plain text information and visual structural information from a machine readable document of the machine readable documents (block 430). For example, annotation platform 220 (e.g., using computing resource 224, processor 320, and/or the like) may extract plain text information and visual structural information from a machine readable document of the machine readable documents. In some implementations, the plain text information may include textual information (e.g., printed text), provided in the machine readable document, that may be understood and processed by an AI model. In some implementations, the visual structural information may include visual information (e.g., tables, graphs, lines, images, highlighting, fonts, font sizes, and/or the like), provided in the machine readable document, that may not be understood and processed by an AI model.

In some implementations, annotation platform 220 may utilize a variety of data extraction methods to extract the plain text information from the machine readable document, such as logical extraction methods (e.g., a full extraction method, an incremental extraction method, and/or the like). The full extraction method may include completely extracting the plain text information from the machine readable document. In the full extraction method, source data (e.g., the machine readable document) may be provided as-is and there may be no need to track the source data for changes. In the incremental extraction method, changes in the source data may need to be tracked since a previous successful extraction, and only the changes in data files may be extracted. The incremental extraction method may detect the changes in the source data from specific columns in the source data that have a last changed timestamp.

In some implementations, annotation platform 220 may utilize a natural language processing technique, a computational linguistics technique, a text analysis technique, and/or the like, as described elsewhere herein, with the plain text information in order to make the plain text information analyzable.

In some implementations, annotation platform 220 may temporarily store the plain text information in one or more data structures associated with annotation platform 220. In such implementations, the temporarily-stored plain text information and the one or more data structures may not be in final formats, but may be in a format that enables annotation platform 220 to determine the final formats of the plain text information and the one or more data structures.

In some implementations, annotation platform 220 may utilize a variety of data extraction methods to extract the visual structural information from the machine readable document, such as logical extraction methods (e.g., a full extraction method, an incremental extraction method, and/or the like), as described elsewhere herein.

In some implementations, annotation platform 220 may temporarily store the visual structural information in one or more data structures associated with annotation platform 220. In such implementations, the temporarily-stored visual structural information and the one or more data structures may not be in final formats, but may be in a format that enables annotation platform 220 to determine the final formats of the visual structural information and the one or more data structures.

In this way, annotation platform 220 may extract the plain text information and the visual structural information from the machine readable document of the machine readable documents.

As further shown in FIG. 4, process 400 may include creating a first document layer and a second document layer with the visual structural information (block 440). For example, annotation platform 220 (e.g., using computing resource 224, processor 320, and/or the like) may create a first document layer, and may create a second document layer with the visual structural information. In some implementations, the first document layer may include a document layer to which AI-generated annotation are provided, as described elsewhere herein. In some implementations, the second document layer may include a document layer with the visual structural information arranged as set forth in the machine readable document.

In some implementations, the first document layer and the second document layer may be arranged so that the first document layer and the second document layer may be aligned and combined to generate a new document (e.g., a structured document), as described elsewhere herein. The new document may include multiple document layers. By using multiple document layers, specific areas or kinds of content in the new document may be created and edited without affecting other areas or kinds of content. For example, if the new document prints slowly because it contains many large graphics, one document layer may be used for text in the new document. Then, when the text needs to printed, all other document layers may be hidden and only the text document layer may be printed. In some implementations, document layers may be used to display alternate design ideas for a same layout. In some implementations, document layers may be similar to transparent sheets stacked on top of each other. If a particular document layer does not include objects, the particular document layer can be see through to any objects on document layers behind the particular document layer.

In this way, annotation platform 220 may create the first document layer, and may create the second document layer with the visual structural information.

As further shown in FIG. 4, process 400 may include processing the plain text information with an AI model to generate AI-generated annotations for the first document layer (block 450). For example, annotation platform 220 (e.g., using computing resource 224, processor 320, and/or the like) may process the plain text information with an AI model to generate AI-generated annotations for the first document layer. In some implementations, an AI model of annotation platform 220 may be associated with a data structure that provides relevant information based on processing performed by the AI model. In some implementations, the AI model may include any AI model that analyzes text, identifies relevant information in the text based on the analysis, and provides annotations (e.g., different highlighting, different fonts, different text sizes, graphics, and/or the like) to the relevant information in the text.

In some implementations, the relevant information may include information of interest to a user of user device 210 and/or an operator of annotation platform 220. For example, the relevant information may include names of persons, names of organizations, names of diseases, names of pharmaceuticals, names of medical conditions, names of locations, expressions of time, quantities, monetary values, percentages, and/or the like. In one example, if the user of user device 210 and/or the operator of annotation platform 220 is associated with the medical field, the relevant information may include names of diseases, names of treatments for diseases, names of pharmaceuticals for diseases, information associated with drug tests, and/or the like.

In some implementations, the AI model may include one or more of a named-entity recognition (NER) model, a conditional random field (CRF) model, a naïve string search model, a Rabin-Karp string search model, a Knuth-Morris-Pratt model, a Boyer-Moore string search model, a two-way string-matching model, and/or the like.

In some implementations, the NER model may include a model that identifies and classifies named entities in data into pre-defined categories, such as names of persons, organizations, diseases, pharmaceuticals, medical conditions, locations, expressions of time, quantities, monetary values, percentages, and/or the like. In some implementations, the NER model may include a phase for detection of names and a phase for classification of names. Name detection may include identification of names as continuous spans of one or more tokens. For example, name detection may process the sentence "Jim has worked at the Bank since 2006" to identify "Jim," "Bank," and "2006." Classification may include selecting and applying an ontology that organizes categories of things, and assigns each name to a type based on the ontology. For example, classification may classify "Jim" as a person, "Bank" as an organization, and "2006" as a time.

In some implementations, the CRF model may include an artificial intelligence model that applies a conditional random field to process plain text information to generate the plain text information with artificial intelligence-generated annotations. The CRF model is a type of statistical modeling method that can be applied in machine learning and used for structured prediction. Whereas some models (e.g., discrete classifiers) predict a label for a single sample without considering neighboring samples, a CRF model can take context into account. For example, a linear chain CRF can predict sequences of labels for sequences of input samples. The CRF model may include a discriminative undirected probabilistic graphical model that can be used to encode known relationships between observations and construct consistent interpretations. The CRF model may be used for labeling or parsing of sequential data, such as natural language processing, and may find applications in NER, part-of-speech (POS) tagging, and/or shallow parsing (i.e., chunking).

In some implementations, the naïve string search model may include an artificial intelligence model that applies a particular kind of string search (i.e., a naïve string search) model. A string search model seeks to identify a place where one or several strings (also called patterns) are found within a larger string or text. A naïve string search employs a simple approach to determine where a particular string occurs inside a larger string by checking each place the particular string could be. The naïve string search examines the larger string starting with a first character, and continuing to each next character, one by one, to determine whether the particular string is present.

In some implementations, the Rabin-Karp string search model may include an artificial intelligence model that applies a particular kind of string search (i.e., a Rabin-Karp string search) model. The Rabin-Karp model uses hashing to find any one of a set of pattern strings in text. A hash function is applied to convert every string into a numeric value (i.e., a hash value) such that if two strings are equal, the hash value will be equal. As a result, the string matching process may compute the hash value of the search pattern and then search for substrings of the input string with that hash value.

In some implementations, the Knuth-Morris-Pratt model may include an artificial intelligence model that applies a particular kind of string search (i.e., Knuth-Morris-Pratt) model. The Knuth-Morris-Pratt model searches for occurrences of a word within a main text string by employing an observation that when a mismatch occurs, the word itself embodies sufficient information to determine where the next match could begin, thus bypassing re-examination of previously matched characters. The Knuth-Morris-Pratt model employs a partial match table based on matching prefixes and suffixes of sub-patterns of strings.

In some implementations, the Boyer-Moore string search model may include an artificial intelligence model that applies a particular kind of string search (i.e., a Boyer-Moore string search) model. The Boyer-Moore model pre-processes the string being searched for the pattern, but not the string being searched in the text. The Boyer-Moore model may be well-suited for applications in which the pattern is much shorter than the text or where it persists across multiple searches. The Boyer-Moore model uses information gathered during a preprocess step to skip sections of the text, resulting in a lower constant factor than many other string search models. The Boyer-Moore model may match on a tail of a pattern rather than a head of the pattern, and may skip along the text in jumps of multiple characters rather than searching every single character in the text.

In some implementations, the two-way string-matching model may include an artificial intelligence model that applies a particular kind of string search (i.e., a two-way string matching) model. The two-way string-matching model is linear in time and uses constant space, and is an intermediate between the Knuth-Morris-Pratt model and the Boyer-Moore model. The two-way string-matching model relies on a previously known result in combinatorics on words, called the critical factorization theorem, which relates a global period of a word to a local repetitions of blocks.

In some implementations, annotation platform 220 may process the plain text information with the AI model and the relevant information to generate the AI-generated annotations for the first document layer. In some implementations, annotation platform 220 may utilize the AI model to compare the plain text information and the relevant information, and to identify matching relevant information in the plain text information based on the comparison. In such implementations, annotation platform 220 may generate annotations (e.g., different highlighting, different fonts, different text sizes, graphics, and/or the like) for the matching relevant information in the plain text information.

In this way, annotation platform 220 may process the plain text information with the AI model to generate the AI-generated annotations for the first document layer.

As further shown in FIG. 4, process 400 may include aligning the first document layer, with the AI-generated annotations, and the second document layer to generate a structured document (block 460). For example, annotation platform 220 (e.g., using computing resource 224, processor 320, and/or the like) may align the first document layer, with the AI-generated annotations, and the second document layer to generate a structured document. In some implementations, annotation platform 220 may align and combine the first document layer (e.g., with the AI-generated annotations) and the second document layer (e.g., the visual structural information) into the structured document.

In some implementations, the structured document may include a document that combines the visual structural information and the annotations into a single document. In some implementations, the structured document may include multiple document layers (e.g., the first document layer with the AI-generated annotations and the second document layer with the visual structural information). By using multiple document layers, specific areas or kinds of content in the structured document may be created and edited without affecting other areas or kinds of content. In some implementations, the document layers of the structured document may be similar to transparent sheets stacked on top of each other. If a particular document layer of the structured document does not include objects, the particular document layer can be see through to any objects on document layers behind the particular document layer.

In some implementations, annotation platform 220 may match the relevant information with the plain text information (e.g., the first document layer), and may generate annotations for the matched relevant information, as described above in connection with FIG. 1G. In such implementations, annotation platform 220 may continue this process until all occurrences of the relevant information are located and annotated in the plain text information.

In some implementations, annotation platform 220 may map the determined annotations with coordinates in the visual structural information (e.g., the second document layer), as described above in connection with FIG. 1G. In such implementations, annotation platform 220 may search for the relevant information associated with the annotations, may match the relevant information with the visual structural information, and may map the matched annotations with coordinates in the visual structural information. Annotation platform 220 may continue this process until all annotations are mapped with coordinates in the visual structural information.

In this way, annotation platform 220 may align the first document layer, with the AI-generated annotations, and the second document layer to generate the structured document.

As further shown in FIG. 4, process 400 may include providing the structured document for display (block 470). For example, annotation platform 220 (e.g., using computing resource 224, processor 320, and/or the like) may provide the structured document for display. In some implementations, annotation platform 220 may provide the structured document for display to user device 210, and user device 210 may display the structured document to the user (e.g., via a user interface). In some implementations, annotation platform 220 may provide the structured document for display to an operator of annotation platform 220, to users of other user devices 210, and/or the like.

In this way, annotation platform 220 may provide the structured document for display.

As further shown in FIG. 4, process 400 may include receiving relevant information for the structured document and incorporating annotations for the relevant information in the structured document (block 480). For example, annotation platform 220 (e.g., using computing resource 224, processor 320, and/or the like) may receive relevant information for the structured document, and may incorporate annotations for the relevant information in the structured document. In some implementations, the user of user device 210 may utilize user device 210 to provide annotations of further relevant information in the structured document. For example, the user may utilize user device 210 to highlight the further relevant information in the structured document.

In some implementations, the user of user device 210 may cause user device 210 to provide, to annotation platform 220, information indicating the annotations of the further relevant information, and annotation platform 220 may receive the information indicating the annotations of the further relevant information. In some implementations, annotation platform 220 may provide the information, indicating the annotations of the further relevant information, to one or more data structures associated with annotation platform 220. In some implementations, annotation platform 220 may incorporate the annotations of the further relevant information into the structured document. In such implementations, annotation platform 220 may perform the methods described above in connection with FIGS. 1E-1G in order to incorporate the annotations of the further relevant information into the structured document.

In this way, annotation platform 220 may receive the relevant information for the structured document, and may incorporate the annotations for the relevant information in the structured document.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Some implementations described herein provide an annotation platform that generates a structured document based on a machine readable document and artificial intelligence-generated annotations. For example, the annotation platform may receive non-machine readable documents, and may process the non-machine readable documents to generate machine readable documents. The annotation platform may extract plain text information and visual structural information from a machine readable document of the machine readable documents. The annotation platform may create a first document layer, and may create a second document layer with the visual structural information. The annotation platform may process the plain text information with an AI model to generate AI-generated annotations for the first document layer, and may align the first document layer, with the AI-generated annotations, and the second document layer to generate a structured document. The annotation platform may provide the structured document for display, may receive relevant information for the structured document, and may incorporate annotations for the relevant information in the structured document.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
      obtain a machine readable document;
      extract plain text information from the machine readable document;
      create a first document layer that includes the plain text information;
      extract visual structural information from the machine readable document,
         the visual structural information including at least one of:
            a table,
            a graph,
            a line,
            an image,
            highlighting,
            fonts, or
            font sizes;
      create a second document layer that includes the visual structural information;
      process the plain text information with a first artificial intelligence model to generate artificial intelligence-generated annotations for the first document layer;
      align and combine the artificial intelligence-generated annotations of the first document layer and the visual structural information of the second document layer to generate a structured document,
         the artificial intelligence-generated annotations being mapped with coordinates in the visual structural information,
         the visual structural information and the artificial intelligence-generated annotations being combined, to generate the structured document, based on mapping the artificial intelligence-generated annotations with the coordinates, and
         the structured document including the first document layer and the second document layer to thereby allow each of the first document layer or the second document layer to be edited and/or printed independently;
      provide the structured document for display;
      receive an additional annotation after providing the structured document for display;
      process the additional annotation with a second artificial intelligence model to identify the additional annotation in the first document layer;
      align and combine the first document layer, with the artificial intelligence-generated annotations, the second document layer, and the additional annotation to generate a modified structured document; and
      update the first artificial intelligence model based on the additional annotation.

2. The device of claim 1, wherein the one or more processors, when obtaining the machine readable document, are to:
   receive a non-machine readable document; and
   process the non-machine readable document to generate the machine readable document.

3. The device of claim 1, wherein the one or more processors, when processing the plain text information with the first artificial intelligence model, are to:
   search for matching particular information in the plain text information; and
   generate the artificial intelligence-generated annotations based on the search for the matching particular information.

4. The device of claim 1, wherein the first artificial intelligence model includes one or more of:
   a named-entity recognition (NER) model,
   a conditional random field (CRF) model,
   a nave string search model,
   a Rabin-Karp string search model,
   a Knuth-Morris-Pratt model,
   a Boyer-Moore string search model, or
   a two-way string-matching model.

5. The device of claim 1, wherein the one or more processors, when extracting the plain text information from the machine readable document, are to:
   utilize a full extraction method or an incremental extraction method to extract the plain text information from the machine readable document.

6. The device of claim 1, wherein the one or more processors are further to:
   receive a non-machine readable document; and
   process the non-machine readable document to generate the machine readable document,
      wherein the non-machine readable document includes at least one of:
         one or more scanned portable document format (PDF) documents,
         one or more images,
         one or more audio files, or
         one or more video files.

7. The device of claim 1, wherein the one or more processors, when obtaining the machine readable document, are to:
   receive a non-machine readable document; and
   utilize speech recognition to generate the machine readable document.

8. A non-transitory computer-readable medium storing instructions, the instructions comprising:
   one or more instructions that, when executed by one or more processors, cause the one or more processors to:
      receive a non-machine readable document;
      process the non-machine readable document to generate a machine readable document;
      extract plain text information from the machine readable document;
      create a first document layer that includes the plain text information;
      extract visual structural information from the machine readable document, the visual structural information including at least
one of:
a table,
a graph,
a line,
an image,
highlighting,
fonts, or
font sizes;
create a second document layer that includes the visual structural information;
process the plain text information with a first artificial intelligence model to identify artificial intelligence-generated annotations for the first document layer;
align and combine the first document layer, with the artificial intelligence-generated annotations, and the second document layer to generate a structured document,
the artificial intelligence-generated annotations being mapped with coordinates in the visual structural information,
the visual structural information and the artificial intelligence-generated annotations being combined, to generate the structured document, based on mapping the artificial intelligence-generated annotations with the coordinates;
provide the structured document for display, and
the structured document including the first document layer and the second document layer to thereby allow each of the first document layer or the second document layer to be edited and/or printed independently;
receive an additional annotation after providing the structured document for display;
process the additional annotation with a second artificial intelligence model to identify the additional annotation in the first document layer;
align and combine the first document layer, with the artificial intelligence-generated annotations, the second document layer, and the additional annotation to generate a modified structured document; and
update the first artificial intelligence model based upon the additional annotation.

9. The non-transitory computer-readable medium of claim 8, wherein the one or more instructions that cause the one or more processors to process the non-machine readable document, comprise:
one or more instructions that, when executed by the one or more processors, cause the one or more processors to:
process the non-machine readable document, using one or more techniques, to generate the machine readable document,
wherein the one or more techniques include:
optical character recognition (OCR),
a natural language processing technique,
a computational linguistics technique, or
a text analysis technique.

10. The non-transitory computer-readable medium of claim 8, wherein the one or more instructions that cause the one or more processors to process the plain text information with the first artificial intelligence model, comprise:
one or more instructions that, when executed by the one or more processors, cause the one or more processors to:
match particular information in the plain text information; and
identify the artificial intelligence-generated annotations, in the plain text information, based on matching the particular information.

11. The non-transitory computer-readable medium of claim 8, wherein the first artificial intelligence model includes an artificial intelligence model that:
analyzes text,
identifies particular information in the text based on analyzing the text, and
provides annotations to the particular information in the text.

12. The non-transitory computer-readable medium of claim 8, wherein the one or more instructions that cause the one or more processors to extract the visual structural information from the machine readable document, comprise:
one or more instructions that, when executed by the one or more processors, cause the one or more processors to:
utilize a full extraction method or an incremental extraction method to extract the visual structural information from the machine readable document.

13. The non-transitory computer-readable medium of claim 8, wherein the structured document includes:
the first document layer with the artificial intelligence-generated annotations, and
the second document layer with the visual structural information,
wherein the first document layer, with the artificial intelligence-generated annotations, and the second document layer are combined into a single document.

14. The non-transitory computer-readable medium of claim 8, wherein the non-machine readable document includes at least one of:
one or more scanned portable document format (PDF) documents,
one or more images,
one or more audio files, or
one or more video files.

15. A method, comprising:
receiving, by a device, a non-machine readable document;
processing, by the device, the non-machine readable document to generate a machine readable document;
extracting, by the device, plain text information from the machine readable document;
creating, by the device, a first document layer that includes the plain text information;
extracting, by the device, visual structural information from the machine readable document,
the visual structural information including at least one of:
a table,
a graph,
a line,
an image,
highlighting,
fonts, or
font sizes;
creating, by the device, a second document layer that includes the visual structural information;
processing, by the device, the plain text information with a first artificial intelligence model to identify artificial intelligence-generated annotations in the plain text information for the first document layer;
mapping, by the device, the artificial intelligence-generated annotations with coordinates of the visual structural information;

aligning and combining, by the device, the visual structural information of the second document layer and the artificial intelligence-generated annotations of the first document layer, to generate a structured document, based on mapping the artificial intelligence-generated annotations with the coordinates,
  the structured document including the first document layer and the second document layer to thereby allow each of the first document layer or the second document layer to be edited and/or printed independently;

providing, by the device, the structured document for display;

receiving, by the device, an additional annotation after providing the structured document for display;

processing, by the device, the additional annotation with a second artificial intelligence model to identify the additional annotation in the first document layer;

aligning and combining, by the device, the first document layer, with the artificial intelligence-generated annotations, the second document layer, and the additional annotation to generate a modified structured document; and updating, by the device, the first artificial intelligence model based upon the additional annotation.

16. The method of claim 15, wherein processing the non-machine readable document includes:

processing the non-machine readable document, using optical character recognition (OCR), to convert the non-machine readable document into the machine readable document.

17. The method of claim 15, wherein processing the plain text information with the first artificial intelligence model includes:
  searching for matching particular information in the plain text information; and
  generating the artificial intelligence-generated annotations based on searching for the matching particular information.

18. The method of claim 15,
  wherein the first document layer, with the artificial intelligence-generated annotations, and the second document layer are combined into a single document.

19. The method of claim 15, wherein the first artificial intelligence model includes an artificial intelligence model that analyzes text, identifies particular information in the text based on analyzing the text, and provides annotations to the particular information in the text.

20. The method of claim 15, wherein processing the non-machine readable document to generate the machine readable document comprises:
  utilizing speech recognition to generate the machine readable document.

* * * * *